United States Patent [19]
Okada et al.

[11] 3,839,598
[45] Oct. 1, 1974

[54] APERTURE CORRECTION CIRCUIT

[75] Inventors: Takashi Okada, Kanagawa-ken; Yoshiaki Ogawara, Tokyo, both of Japan

[73] Assignee: Sony Corporation, Tokyo, Japan

[22] Filed: July 12, 1973

[21] Appl. No.: 378,450

[30] Foreign Application Priority Data
July 13, 1972 Japan ................................ 47-70227

[52] U.S. Cl. ............................ 178/7.1, 178/DIG. 25
[51] Int. Cl. .............................................. H04n 5/14
[58] Field of Search........ 178/7.1, DIG. 25, DIG. 34

[56] References Cited
UNITED STATES PATENTS

| | | | |
|---|---|---|---|
| 2,678,389 | 5/1954 | Loughlin | 178/DIG. 34 |
| 3,153,207 | 10/1964 | Brown | 178/DIG. 25 |
| 3,333,059 | 7/1967 | Davidse | 178/DIG. 25 |
| 3,472,950 | 10/1969 | Izumi et al. | 178/DIG. 25 |

*Primary Examiner*—Richard Murray
*Attorney, Agent, or Firm*—Lewis H. Eslinger, Esq.; Alvin Sinderbrand, Esq.

[57] ABSTRACT

An aperture correction circuit in which a signal component corresponding to input video signals and a differentiated signal component of the input video signal are added and the compound signal component thus obtained are differentiated again and added to the original video input signals whereby a symmetrical aperture correction circuit is attained although the input video signals are distorted asymmetrically.

7 Claims, 32 Drawing Figures

APERTURE CORRECTION CIRCUIT

BACKGROUND OF THE INVENTION

1. Field Of The Invention

This invention relates generally to an aperture correction circuit, and more particularly to an aperture correction circuit by which a symmetrical aperture correction is attained when the input signals are asymmetrically distorted.

2. Description Of The Prior Art

In television receivers or the like, the sharpness of the reproduced pictures is limited by the frequency and phase response of video channels of the receivers and by the size of the beam spot of the cathode ray tube.

In order to improve picture sharpness, so-called aperture correction circuits are well known in the prior art.

Conventional aperture correction circuits of the prior art operate satisfactorily for both rising and falling portions of the video signals when the input video signals applied to the circuits are symmetrically distorted at the rising and falling portions, that is, when the first half portion, and the latter half portion of the respective leading and trailing edges of the supposedly rectangular input video signals are symmetrically distorted.

However, in actual television receivers and the like, the input video signals are usually distorted asymmetrically with respect to the portions mentioned above, because the circuit which supplies the input video signals to the aperture correction circuit has limited frequency and phase response characteristics acting with different effects on the above two portions. As a result, the prior art aperture correction circuits operate asymmetrically so that the reproduced pictures are still lacking in sharpness or are deteriorated in their quality.

It is also known in the prior art to provide a delay line in the aperture correction circuit in order to overcome such an asymmetrical operation of the circuit. But the delay time of the delay line should be short, that is, in the order of several tenths of a microsecond, and it should be kept precisely constant once chosen. Such a delay line is difficult to design and consequently the delay line and the aperture correction circuit become expensive.

Accordingly, it is an object of this invention to provide a novel aperture correction circuit avoiding the above-mentioned disadvantages inherent in the prior art.

It is another object of this invention to provide an improved aperture correction circuit for television receivers and the like.

It is a further object of this invention to provide a novel aperture correction circuit which operates symmetrically for rising and falling portions of video signals even though the input video signals applied to the circuit are distorted asymmetrically at the rising and falling portions.

It is a still further object of this invention to provide a novel aperture correction circuit which operates symmetrically for rising and falling portions of video signals which is simple in construction and is inexpensive.

SUMMARY OF THE INVENTION

The present invention provides a novel aperture correction circuit that operates symmetrically for both rising and falling portions of video signals when the input video signals are asymmetrically distorted at the rising and falling portions. The aperture correction circuit according to this invention includes at least first and second differentiating circuits and first and second adder or subtracter circuits.

The input video signals, which are applied to the aperture correction circuit from an appropriate video signal source, are supplied to the first differentiating circuit and the first and second adder or subtracter circuits simultaneously.

The output signals from the first differentiating circuit are supplied to the first adder or subtracter curcuit and the output signals therefrom are introduced to the second differentiating circuit. In addition, the output signals from the second differentiating circuit are supplied directly or through an inverter circuit to the second adder or subtracter circuit whereby symmetrically aperture corrected signals are derived from the second adder or subtracter circuit.

DESCRIPTION OF THE PREFERRED EMBODIMENTS

Figure 1:
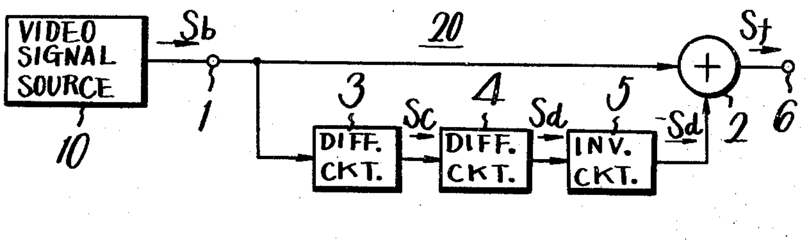
FIG. 1 is a block diagram of an aperture correction circuit according to the prior art.

In FIG. 1, the output of a video signal source 10 is connected to an input terminal 1 of an aperture correction circuit 20. The aperture correction circuit comprises an adder circuit 2 and a differentiating circuit 3, both connected directly to the input terminal 1 to receive, simultaneously, video input signals supplied thereto. The defferentiated output signal of the first differentiating circuit 3 is connected to a second differentiating circuit 4, and the output of the latter is connected through an inverter circuit to the adder circuit 2. An output terminal 6 for the aperture correction circuit 20 is also the output terminal of the adder circuit 2.

Figure 2A:
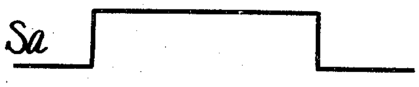
FIGS. 2A–2F and 3A–3F are waveform diagrams to which reference will be made in explaining the operation of the circuit shown in FIG. 1.
Figures 2B, 2C, 2D, 2E, 2F:
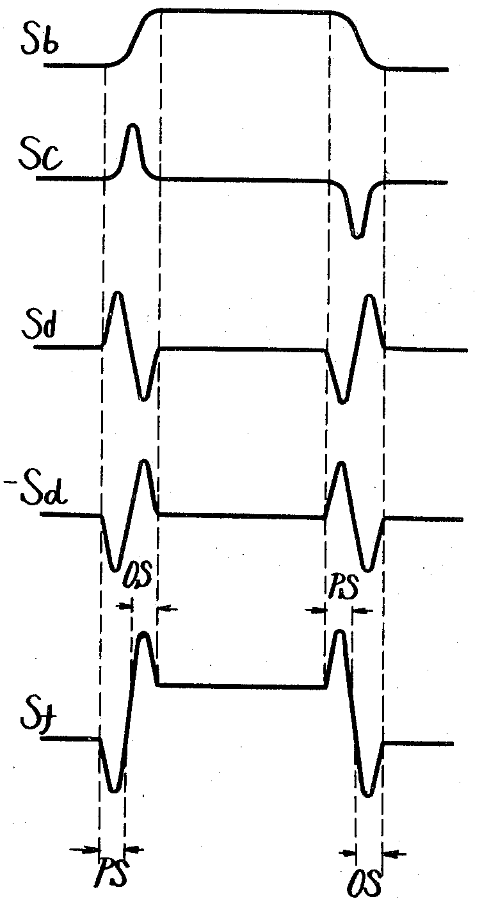
Figures 3A, 3B, 3C, 3D, 3E, 3F:
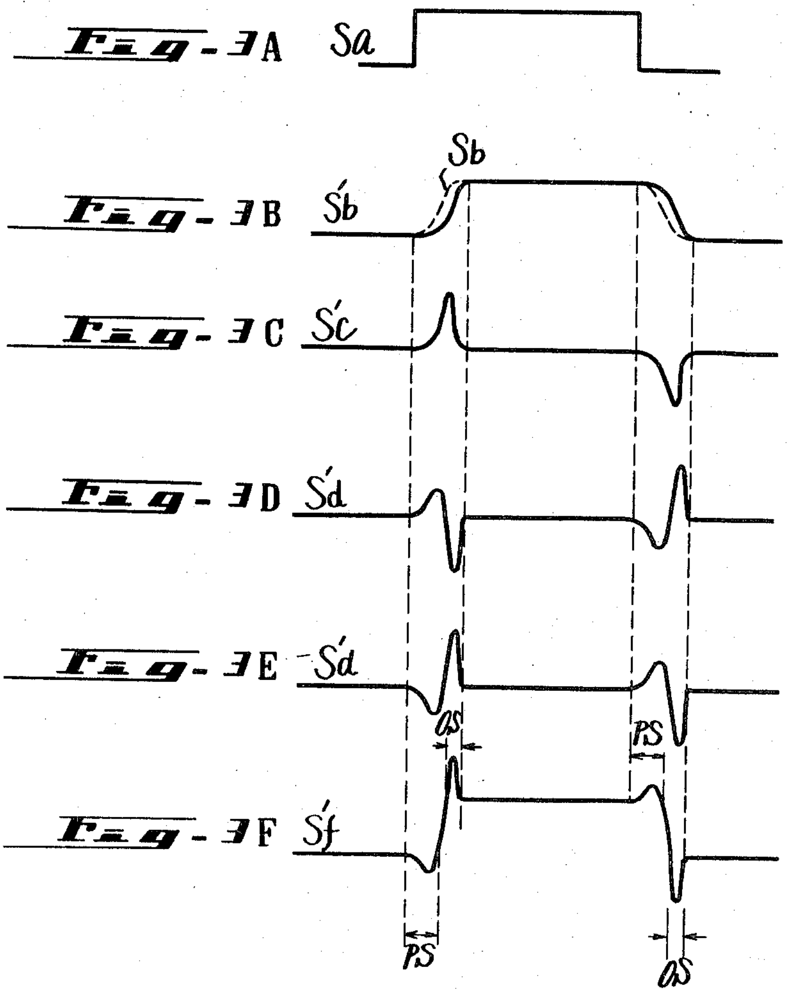

Before explaining the operation of the cirucit in FIG. 1, the waveforms $S_a$, $S_b$, $S_b'$, $S_c$, and $S_c'$ of FIGS. 2A–2C, and 3A-3C will be explained. The waveform $S_a$ in FIGS. 2A and 3A shows an idealized square wave video signal, and the waveforms S in FIG. 2B and 3B show distorted square wave video signals based on the original square wave video signal. Such distortion is inevitable because the frequency and phase characteristics of the circuit in video signal source 10 in FIG. 1 are limited.

The difference between the signal $S_b$ in FIG. 2B and the signal $S_b'$ in FIG. 3B is that the signal $S_b$ in FIG. 2B is symmetrically distorted at its rising and falling portions, while the signal $S_b'$ in FIG. 3B is asymmetrically distorted. To illustrate the difference, the waveform $S_b$ in FIG. 2B is repeated in FIG. 3B in dotted lines. As may be seen, a symmetrically distorted signal, such as the signal $S_b$ in FIG. 2B, is one in which the first half portion and the latter half portion of the respective leading and trailing edges of the wave are symmetrically distorted. An asymmetrically distorted signal is one in which the first half portion and the latter half portion of the respective leading and trailing edges of the wave are asymmetrically distorted. In other words, when the waveform $S_c$ in FIG. 2C, which is obtained by differentiating the waveform $S_b$ in FIG. 2B, is symmetrical with respect to the center line, the signal $S_b$ is a symmetrically distorted signal. When the differentiated waveform $S_c'$ in FIG. 3C is asymmetrical with respect to the center line, the waveform $S_b'$ in FIG. 3B corresponds to an asymmetrically distorted signal.

From the inspection of the waveform $S_c$ in FIG. 2C with the waveform $S_c'$ in FIG. 3C, it is clear that the signal $S_b$ in FIG. 2B is symmetrically distorted and that the signal $S_b'$ is an asymmetrically distorted signal.

In the circuit in FIG. 1, the video signal having the waveform $S_b$ in FIG. 2B or the waveform $S_b'$ in FIG. 3B is supplied simultaneously from the video signal source 10 to the adder circuit 2 and to the differentiating circuit 3. The resultant output signal $S_c$ or $S_c'$ of the differentiating circuit 3 as shown in FIG. 2C or 3C is further differentiated in the second differentiating circuit 4, and an output signal $S_d$ or $S_d'$ as shown in FIG. 2D or FIG. 3D is derived from the circuit 4. This signal $S_d$ or $S_d'$ is usually called a twice-differentiated signal of the input video signal.

The polarity of the signal $S_d$ or $S_d'$ is inverted in the inverter circuit 5, and the output signal $-S_d$ or $-S_d'$ as shown in FIG. 2E or FIG. 3E is derived and supplied to the adder circuit 2 wherein the input signal $S_b$ or $S_b'$ is added to the signal $-S_d$ or $-S_d'$ to produce a compound signal $S_f$ or $S_f'$ as shown in FIG. 2F or FIG. 3F.

The signal $S_f$ or $S_f'$ is referred to as an aperture corrected signal, and the signal $S_f$ or $S_f'$ has precursor portions PS or PS' and overshoot portions OS or OS' as shown in FIG. 2F or FIG. 3F. The signal $S_f$ or $S_f'$ is supplied to the cathode ray tube (not shown) and improves the sharpness of the reproduced video signals therein.

However, inspection of the aperture corrected signals $S_f$ and $S_f'$ in FIG. 2F and FIG. 3F, reveals that the signal $S_f$ in FIG. 2F is symmetrically corrected, but the signal $S_f'$ in FIG. 3F is not symmetrically corrected. This is caused by the fact the aperture correction circuit of FIG. 1 operates symmetrically only when the input video signal is symmetrically distorted. Thus, when the input video signal is asymmetrically distorted, the aperture corrected signal also becomes asymmetrical and the reproduced picture takes on an unnatural appearance.

In view of the fact that the input signal is usually distorted asymmetrically because of the amplitude and phase characteristics of the circuit in the video signal source 10, the circuit of FIG. 1 is not a satisfactory aperture correction circuit.

To avoid the disadvantages of the circuit in FIG. 1, it is known in the prior art to insert a delay line in the circuit between the input terminal 1 and the adder circuit 4 or between the input terminal 1 and the differentiating circuit 3 in order to delay the input signal $S_b$ or $S_b'$ with respect to the twicedifferentiated signal, or vice versa. But such a delay line should delay signals in the order of a few tenths of a microsecond, and the delay time should be constant once chosen. Such a delay line is difficult to design and consequently the cost is high.

According to the present invention such a disadvantage inherent in the prior art is avoided and an improved aperture correction circuit is provided with a simple construction.

According to the present invention, the video input signal is differentiated in a first differentiating circuit and the differentiated signal is added to or subtracted from the input signal in a first adder or subtracter circuit. The resultant compound signal is again differentiated in a second differentiating circuit and the output signal therefrom is inverted in an inverter circuit and added to the input signal in a second adder circuit. The aperture corrected signal is derived from the second adder circuit.

Figure 4:
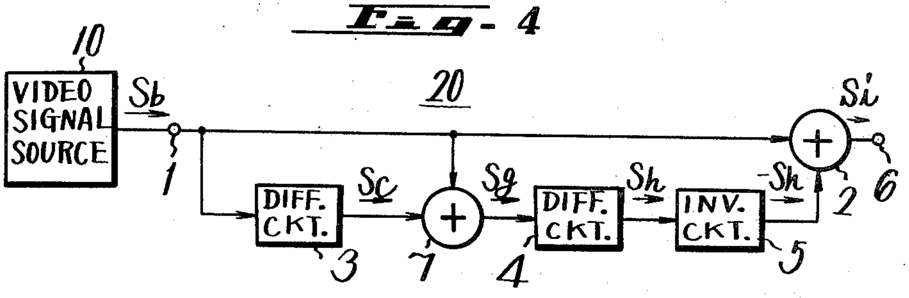
FIG. 4 is a block diagram illustrating an aperture correction circuit according to the present invention.
Figures 5A, 5B, 5C, 5D, 5E, 5F:
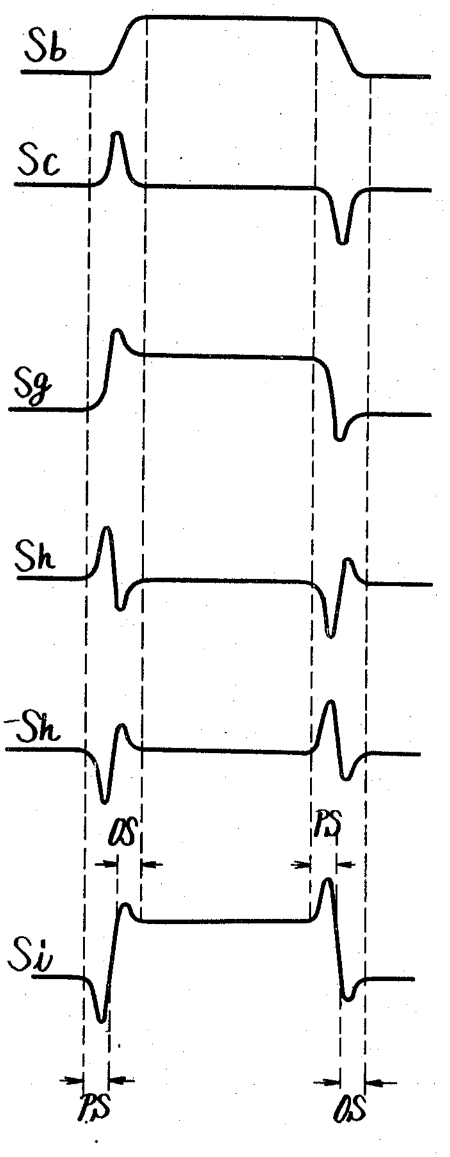
FIGS. 5A–5F and 6A–6F are waveform diagrams to which reference will be made in explaining the operation of the embodiment shown in FIG. 4.

FIG. 4 shows one embodiment of the present invention in which reference numerals similar to those of FIG. 1 represent similar components. To make the explanation simple and clear, the input video signal $S_b$ in FIG. 4 will first be assumed to be a symmetrically distorted square wave as shown in FIG. 5A. This symmetrically distorted input video signal $S_b$ is supplied to adder circuits 2 and 7, respectively, and to the differentiating circuit 3. The output signal $S_c$ from the circuit 3 is shown in FIG. 5B and is supplied to the adder circuit 7 to be added to the input signal $S_b$. The output signal $S_g$ from the adder circuit 7 is shown in FIG. 5C and is differentiated in the second differentiating circuit 4. The output signal $S_h$ from the differentiating circuit 4 is shown in FIG. 5D and is inverted in the inverter circuit 5.

The output signal $-S_h$ from the inverter circuit 5 is shown in FIG. 5E and is supplied to the adder circuit 2 where it is added to the input signal $S_b$ to produce an output signal $S_i$ as shown in FIG. 5F. This is the aperture corrected signal, which becomes asymmetrical as shown in FIG. 5F when the input video signal $S_b$ is symmetrically distorted as shown in FIG. 5A.

This is one of the important and specific concepts of the present invention, because in the aperture correction circuit of FIG. 1, the aperture corrected signal $S_f$ is symmetrical when the input signal $S_b$ is symmetrically distorted. Close inspection of the waveforms of FIGS. 5A–5F shows that the aperture corrected signal $S_i$ in the circuit of FIG. 4 has high level precursor portions and low level overshoot portions when the input video signal $S_b$ is symmetrically distorted.

Considering again the waveforms in FIGS. 3A–3F, it will be noted that the aperture corrected signal $S_f'$ of the circuit of FIG. 1 has low level precursor portions and high level overshoot portions as shown in FIG. 3F when the input video signal $S_b$ is distorted as shown in FIG. 3B. This distortion causes the first half portions of both the leading and trailing edges to slope less than the latter half portions.

In the circuit of FIG. 4, on the other hand, if the input video signal $S_b$ is distorted asymmetrically as shown in FIG. 3B, the aperture corrected signal $S_i$ of FIG. 5F will be symmetrical. This is because the circuit of FIG. 4 makes the level of the amplitude of the precursor portions of the input signal higher than that of the overshoot portions.

Figures 6A, 6B, 6C, 6D, 6E, 6F:
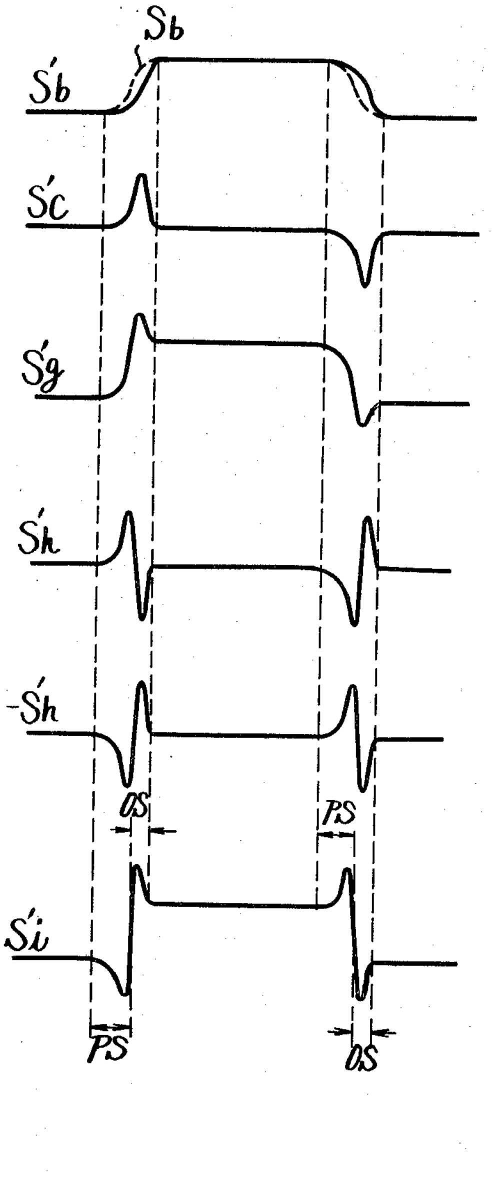

FIGS. 6A–6F show waveforms similar to those in FIGS. 5A–5F but with the input signal $S_b'$ distorted in the same way as the input signal $S_b'$ in FIG. 3B. As shown in FIG. 6F, the aperture corrected signal $S_i'$ of the circuit in FIG. 4 becomes symmetrical when the input signal $S_b'$ is asymmetrical as in FIG. 6B. Accordingly, the circuit of FIG. 4 operates symmetrically when the input signal is distorted asymmetrically. Furthermore, the circuit is relatively simple, because only an adder circuit 7 need be added to the prior art circuit of FIG. 1. Yet the rearrangement of the circuit components results in an improvement in operation not possible with the prior art circuit.

When the input signal $S_b'$ is supposed to be distorted inversely as compared to the input signal as shown in FIG. 6B, that is, when the first half portions slope more sharply than the latter half portions in the respective leading and trailing edges, the adder circuit 7 in FIG. 4 must be changed to a subtracter circuit so that the level of the overshoot portions will be made higher than the level of the precursor portions of the input signal. However, such a case is rare in an actual video amplifier because of the normal frequency and phase characteristics.

Figures 7, 8:
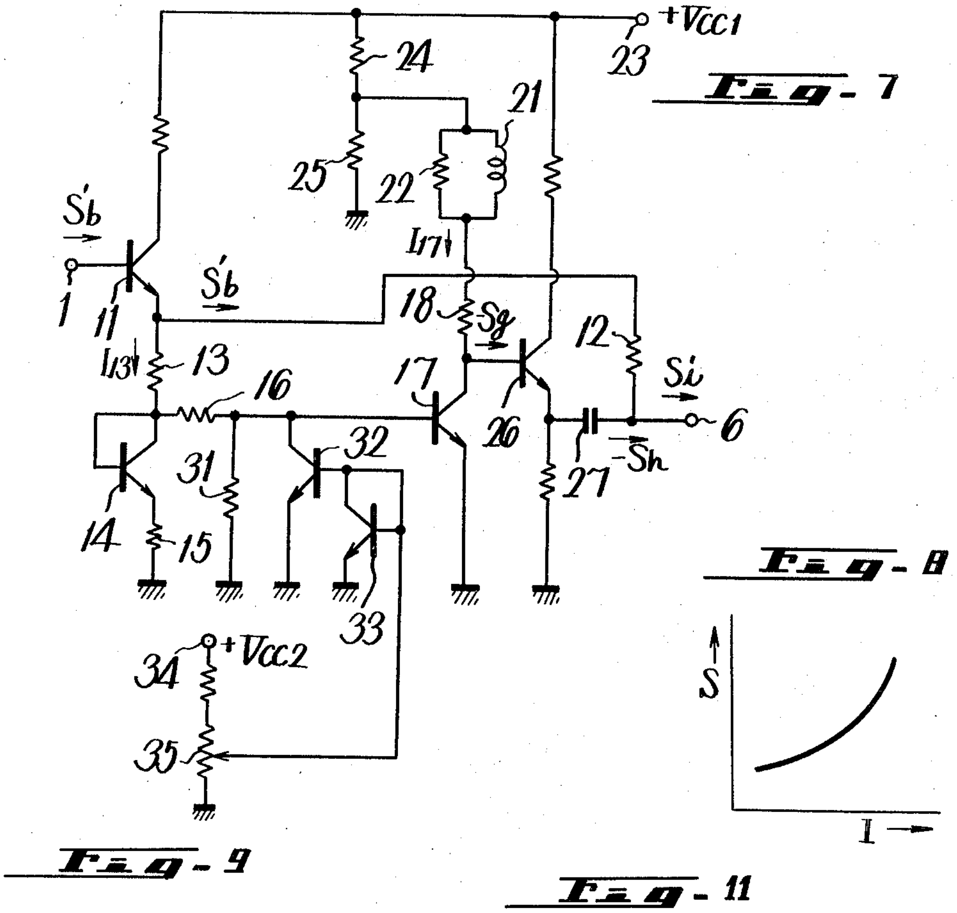
FIG. 7 is a detailed partial schematic diagram of the embodiment depicted in FIG. 4.
FIGS. 8–11 are waveform diagrams to which reference will be made in explaining the operation of the circuit shown in FIG. 7.

FIG. 7 is a detailed schematic circuit diagram of the aperture correction circuit 20 shown in block form in FIG. 4.

In FIG. 7 the input video signal $S_b$ or $S_b'$ is supplied by way of the input terminal 1 to the base of a transistor 11, which is biased at an appropriate voltage through a base circuit (not shown). The emitter of the transistor 11 is connected to the output terminal 6 through a resistor 12 and to ground through a series circuit comprising a resistor 13, a diode connected transistor 14, and a resistor 15. The resistor 13 has a resistance value such that the emitter circuit of the transistor 11 serves as a constant current circuit. The connection point between the resistor 13 and the diode connected transistor 14 is connected by way of a resistor 16 to the base of a transistor 17 that has the same characteristics as the transistor 14. The emitter of the transistor 17 is connected to ground and the collector is connected by means of a resistor 18 and a parallel-connected inductance 21 and resistor 22 to a connection point between resistors 24 and 25. These resistors are connected in series between a voltage supply terminal 23 and the ground. The collector of the transistor 17 is also connected to the base of a transistor 26. The emitter of the transistor 26 is connected by a capacitor 27 to the output terminal 6.

The base of the transistor 17 is connected to the ground through another parallel circuit comprising a resistor 31 and the collector emitter circuit of a transistor 32. The base of the transistor 32 is connected to ground through a diode connected transistor 33 and is also connected to the top of a variable resistor 35. The latter is connected in series with another resistor 34 between a voltage supply terminal 36 and ground. The resistor 31, the transistors 32 and 33, the resistor 34, and the variable resistor 35 form a level control circuit for the twice-differentiated and inverted signal $-S_h$ in FIG. 6E.

In the operation of FIG. 7 the asymmetrically distorted input signal $S_b'$ supplied to the input terminal 1 is transmitted through to the output terminal 6 by the transistor 11 and the resistor 12. The base emitter voltage of the transistor 14 is utilized to produce the base bias voltage of the transistor 17. The input signal $S_b'$ from the input terminal 1 is also supplied from the transistor 11 to the base of the transistor 17 through the resistors 13 and 16. The transistor 17 operates as both the differentiation circuit 3 and the adder circuit 7 in FIG. 4 because of the parallel connection of the inductance 21 and the resistor 22 connected in the collector circuit of the transistor 17.

The input signal $S_b'$ supplied to the base of the transistor 17 is amplified and inverted by the transistor 17 and differentiated by the inductance in the collector circuit, and the signal component corresponding to $-S_c'$ is obtained at the collector of the transistor 17. At the same time the amplified and inverted signal component of the input signal $S_b'$ is also obtained at the collector of the transistor 17 because of the resistor 22 which is connected in parallel with the inductor 21 in the collector circuit. Consequently the compound signal of the inverted input signal component $-S_b'$ and the inverted and differentiated signal component $-S_c'$ are added at the collector of the transistor 17 and the signal $-S_g'$ is obtained. This signal $-S_g'$ is passed along to the output terminal 6 through the transistor 26 and the condenser 27. The signal $-S_g'$ is differentiated by the condenser 27 to produce the signal $-S_h'$ at the output terminal 6. At the same time that the input signal $S_b'$ reaches the output terminal 6, the compound signal at the output terminal becomes $S_i'$. As mentioned above, the aperture corrected signal $S_i'$ is symmetrical when the input signal $S_b'$ is asymmetrically distorted as shown in FIG. 3B.

In the circuit of FIG. 7 when the setting of the variable resistor 35 is changed, the impedance of the collector-emitter path of the transistor 32 also changes, and consequently, the bias voltage in the base-emitter path of the transistor 17 changes. This is because the input current through the resistor 16 is variably shunted through the collector-emitter path of the transistor 32 in accordance with the position of the top of the variable resistor 35. When the base bias voltage of the transistor 17 is changed, the collector current of the transistor 17 changes and the gain of the transistor 17 changes. Consequently, the level of the signal $-S_g$ or $S_h$ is changed accordingly. As the level of the signal $-S_h$ is controlled, variable correction voltage control is available in the aperture correction circuit.

FIG. 8 shows the relation between the beam current I and spot size S of the cathode ray tube. This relation is nonlinear and is such that the rate of increase of spot size S with respect to beam current I is greater than unity. Therefore, when the level of the signal $-S_h'$ is controlled so that the aperture correction is satisfactory for a relatively high level of the input signal $S_b'$, the correction is likely to be excessive when the level of the input signal $S_b'$ is low due to the setting of the brightness control. This causes the signal-to-noise ratio of the reproduced picture to become low. Under that condition the quality of the picture becomes poor. When the level of the signal $-S_h'$ is controlled so that the aperture correction is correct when the level of the input signal $S_b'$ is relatively low, the correction is likely to be insufficient when the level of the input signal $S_b'$ is high. This occurs when, for example, the brightness control is set so that the level of the input signal $S_b'$ is high and the sharpness of the reproduced picture is not sufficiently improved.

Figure 9:
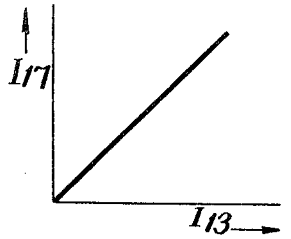
Figures 10A, 10B:
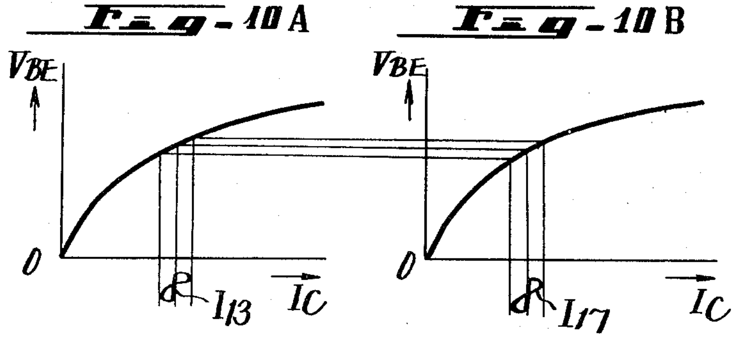

The circuit of FIG. 7 avoids such a disadvantage. This may be explained by assuming, first, that the resistors 15 and 31 are not connected in the circuit, the transistor 32 is in its non-conductive condition, and the base currents of the transistors 14 and 17 are negligible. Under such conditions the collector currents of the respective transistors 14 and 17 become equal, because the transistors are selected so that their characteristics are approximately the same and the current $I_{13}$ which flows through the resistor 13 and the current $I_{17}$ which flows through the collector of transistor 17 become equal and the relationship between $I_{13}$ and $I_{17}$ becomes linear as shown in FIG. 9. This is because, although the relationship between the current $I_c$ and the base emitter voltage $V_{BE}$ of the transistor 14 is non-linear, as shown in FIG. 10A, $I_{13}$ is first converted to the voltage $V_{BE}$ and this voltage $V_{BE}$ is supplied as the base emitter voltage of the transistor 17. As a result, the collector current $I_{17}$ of the transistor is linear relative to the current $I_{13}$, as shown in FIGS. 10A and 10B.

Figure 11:
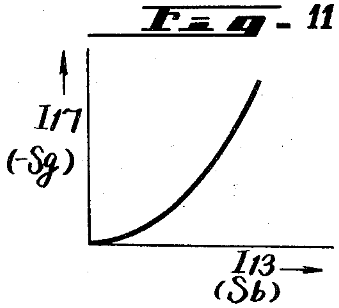

However, when the resistor 15 is connected, a voltage drop exists across the resistor 15 due to the emitter current of the transistor 14, and this voltage is also supplied to the base of the transistor 17 additively with the $V_{BE}$ voltage of the transistor 14, so the relationship between $I_{13}$ and $I_{17}$ becomes non linear as shown in FIG. 11.

The rate of increase of the current $I_{17}$ is larger than the rate of increase of the current $I_{13}$. This means that the rate of increase of the correction signal $S_g'$ or $S_h'$ is larger than the rate of increase of the input signal $S_b'$, and the level of the aperture correction is automatically controlled with respect to the input signal $S_b'$. As a result, the aperture correction of the reproduced picture is always proper, and the picture has improved sharpness. A more natural picture can be reproduced utilizing this circuit.

What is claimed is:

1. An aperture correction circuit comprising:

A. an input terminal for receiving a video signal from a video signal source;

B. an output terminal;

C. a first differentiating circuit connected to said input terminal for differentiating said video signal;

D. a first combining circuit connected between said input terminal and said first differentiating circuit for combining a part of said video signal and an output signal from said first differentiating circuit;

E. a second differentiating circuit connected to said first combining circuit for differentiating an output signal from said first combining circuit; and F. a second combining circuit connected between said input terminal and said second differentiating circuit for combining an output signal from said second differentiating circuit with said video signal to produce an aperture corrected signal at said output terminal.

2. The aperture correction circuit of claim 1 in which said first and second combining circuits are adder circuits.

3. The aperture correction circuit of claim 1 in which said first and second combining circuits are subtractor circuits.

4. The aperture correction circuit of claim 1, wherein said first differentiating circuit and said first combining circuit comprise:

A. a transistor having a control electrode and a first and a second output electrode;

B. means for connecting said input terminal to said control electrode;

C. a parallel connection of a resistor and an inductance connected to said first output electrode;

D. means for connecting said second output electrode to a reference potential; and E. means connected to said first output electrode for deriving an output signal representative of a compound signal of said part of the video signal and the differentiated signal of said video signal.

5. The aperture correction circuit of claim 4, wherein said circuit further comprises gain control means connected between said control electrode and the reference potential for controlling the gain of said transistor.

6. The aperture correction circuit of claim 4, wherein said second differentiating circuit and said second combining circuit comprise:

A. a condenser connected between said first output electrode and said output terminal, and circuit means for connecting said input terminal to said output terminal.

7. The aperture correction circuit of claim 4, wherein said control electrode, first output electrode and second output electrode are base, collector and emitter electrodes, respectively, and said aperture correction circuit further comprises:

A. a series connection of a diode and a resistor; and

B. circuit means for connecting said series connection between said base and emitter electrodes in parallel, said video signal being applied to a connection point between said series connection and the base electrode.

* * * * *